No. 773,474. Patented October 25, 1904.

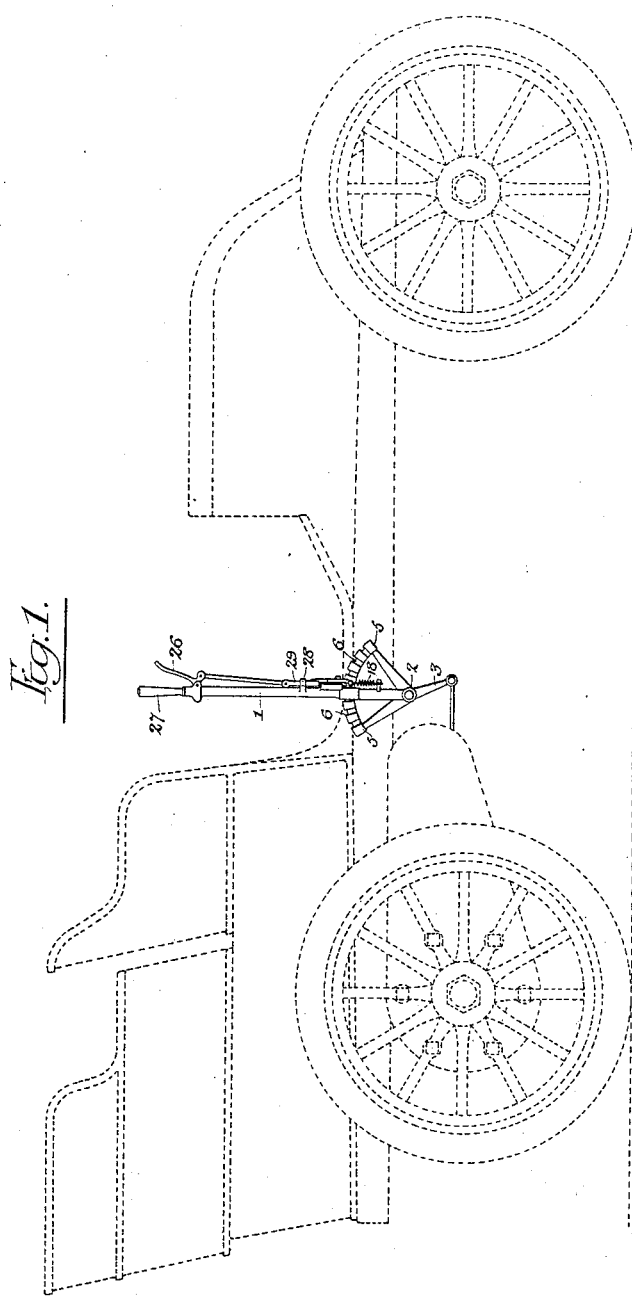

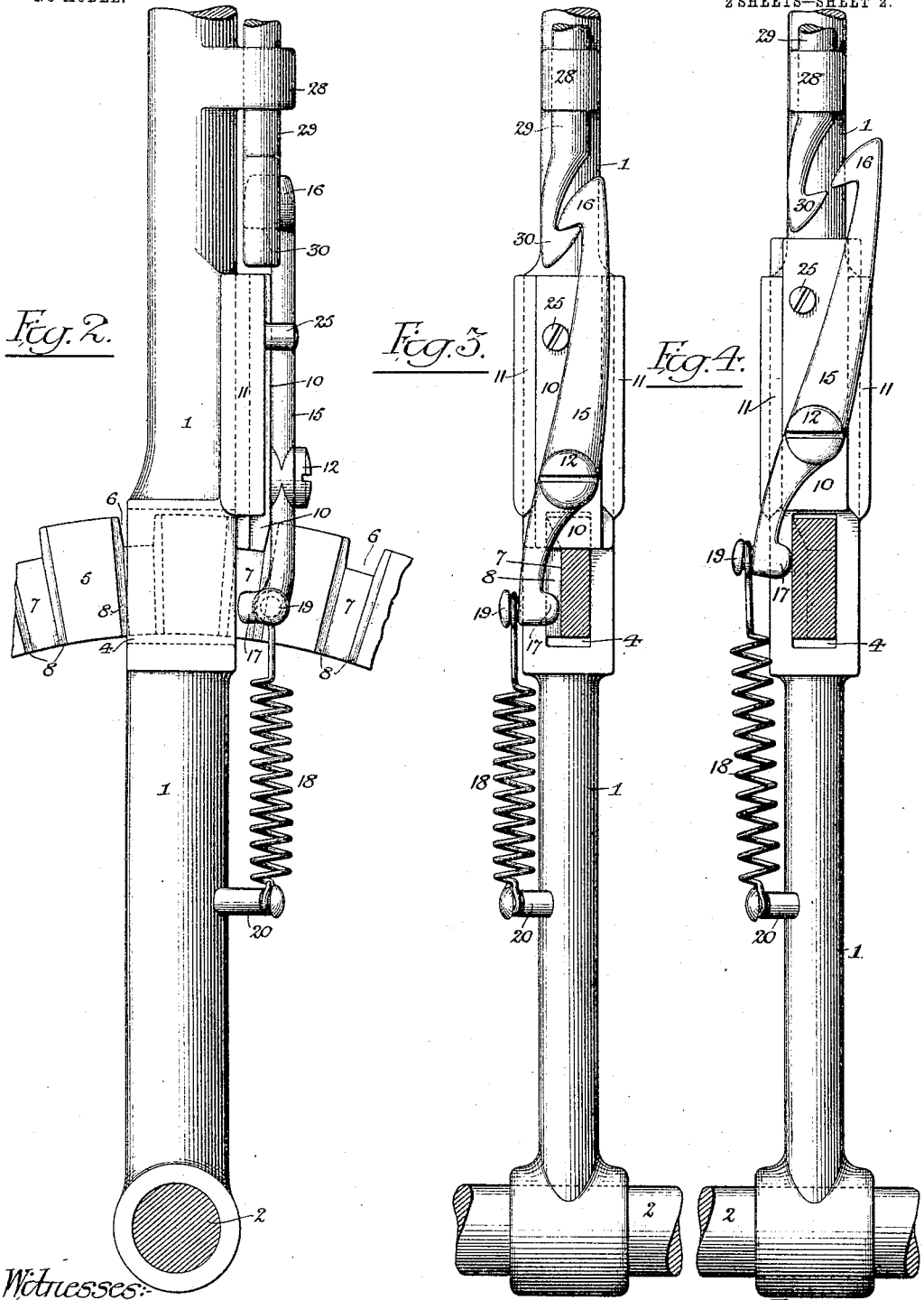

UNITED STATES PATENT OFFICE.

LEE S. CHADWICK, OF RIDLEY PARK, PENNSYLVANIA.

LEVER MECHANISM.

SPECIFICATION forming part of Letters Patent No. 773,474, dated October 25, 1904.

Application filed December 31, 1902. Serial No. 137,342. (No model.)

*To all whom it may concern:*

Be it known that I, LEE S. CHADWICK, a citizen of the United States, residing in Ridley Park, Delaware county, Pennsylvania, have invented certain Improvements in Lever Mechanism, of which the following is a specification.

My invention relates to levers for controlling the operation and speed of power-driven machinery, more particularly applied but not limited to automobiles or other self-impelled vehicles; and it consists of a device which automatically disengages the locking-pawl each time the lever is moved, whereby such pawl may only be moved a notch at a time.

My invention is fully illustrated in the accompanying drawings, in which—

Figure 1 shows a view in dotted outline of an automobile of ordinary type, showing one application of the lever mechanism forming the subject of my invention. Fig. 2 is an enlarged view in elevation of the mechanism forming the subject of my invention; and Figs. 3 and 4 are side elevations, partly in section, showing the controlling mechanism in different positions.

As usually arranged the operative lever controlling the operation and speed of power-driven machinery is provided with a spring-controlled pawl, which pawl is adapted to rest in any one of a series of notches of a segmental rack, said notches being arranged so that the different positions of the lever will indicate the different speeds of the machinery and in the case of an automobile or other vehicle will indicate the different speeds as well as the position for reversing the vehicle. As ordinarily arranged, however, particularly for use with automobiles, there is no means provided for preventing the pushing of the lever the full length of the segmental rack. Hence at night there is great danger of pushing the lever too far, a condition which might result in the speeding of the automobile suddenly and without warning from the extreme low speed to the extreme high speed, or when pushed in the opposite direction the reversing of the vehicle.

The object, therefore, of my invention is to provide a lever mechanism which will permit the movement of the lever a notch at a time only, so that the operation of the machinery will be started or stopped gradually.

In the drawings herewith, Fig. 1 of which shows the application of my invention to an automobile, 1 represents the speed-lever suitably mounted at the side of the automobile and connected at its lower end to a rock-shaft 2, from which shaft arms 3 extend, which arms are connected to the various clutches or other means for throwing in the gearing for the different speeds of the driving mechanism. As shown herewith, though not essentially necessary, the lever 1 is provided with a through-opening 4, whereby it may embrace the segmental rack 5, the latter having notches 6. These notches are disposed in line with recesses 7 on the face of such segmental rack, which recesses are provided with beveled walls 8. Adapted to engage the notches of this segmental rack is the sliding pawl 10, adapted to suitable ways or guides 11, carried by the lever 1. Pivotally mounted upon said pawl at 12 is the two-armed lever 15, the upper end of which lever has a hook 16, while the lower end is provided with a knob 17, adapted to seat in the recesses 7 of the segmental rack. This lever and the pawl to which it is pivoted is held in the lowered position by means of a spring 18, which spring engages a pin 19 on the lever 15 and a pin 20 on the lower part of the lever 1. The pawl 10 is provided with a stop-pin 25, which prevents movement of the lever 15 beyond a certain point. Carried by the lever 1 and arranged to have vertical movement on the same through the medium of a handle 26, adjacent to the handle 27 of the lever 1, being guided by the apertured lug 28 is a rod 29, which carries at its lower end a hook 30, adapted to engage the hook 16 at the upper end of the lever 15. When these parts are connected, as shown in Figs. 1, 2, and 3, the spring 18 serves to hold the rod 29 in the lowered position, and the handle 26 is held out and must be grasped by the fingers and brought toward the handle 27 of the lever 1 to raise said rod and release the pawl 10 from its engagement with one of the notches 6 of the segmental rack.

The operation of my device is as follows: When the handle 27 of the lever 1 is grasped and the handle 26 of the rod 29 is brought in contact with the same, said rod is raised, lifting the pawl 10 from its engagement with one of the notches 6 of the segmental rack. Now if the lever 1 be moved to one side or the other along the segmental rack the projecting knob 17 on the end of the lever 15 will contact with the beveled walls of the recesses 7, and this engagement will cause the said lever to move on its pivot 12, lifting it out of said recess onto the face of the segmental rack, and thereby cause the disengagement of the hook 16 at the upper end of the same from the hook 30 of the rod 29. This disengagement relieves the pawl from any connection with the hand of the operator. Consequently upon the further movement of the lever the pawl will seat itself in the first notch of the segmental rack that it reaches, being carried into place by the spring 18. This action also straightens the lever 15, as its knob or projection finds a resting-place in the recess adjacent to the notch holding the pawl, and as the rod 29 has been released, permitting the lowering of the same immediately after the disengagement of the lever 15, the hook of said lever 15 upon its return to its normal position will drop into place and engage the hook 30 of the rod. By this means the pawl 10, carried by the lever 1, may only be moved one notch at a time, as upon each movement of said lever the lever 15 will serve to disengage the pawl and put it temporarily out of control by the rod 29.

Having thus described my invention, I claim and desire to secure by Letters Patent—

1. The combination in lever mechanism, of the main lever, engaging means carried thereby, a racked member coacting with said engaging means, and means controlled by the main lever for preventing the movement of the engaging means more than the distance of one tooth or notch on the racked member.

2. The combination in lever mechanism, of the main lever, a sliding pawl carried thereby, a racked member coacting with said pawl, and means controlled by said main lever for preventing the movement of the pawl more than one notch at a time.

3. The combination in lever mechanism, of the main lever, a sliding pawl mounted thereon, a racked member adapted to be engaged by said pawl, means for connecting said pawl to the main lever whereby it may be operated therefrom, and automatically-operated means for effecting the disengagement of this mechanism, whereby the movement of the lever more than one notch at a time is prevented.

4. The combination in lever mechanism, of the main lever, engaging means carried thereby, a racked member coacting with said engaging means, means for moving said engaging means into and out of contact with the racked member, and automatically-operated means for limiting the operative movements of said lever by the engaging means.

5. The combination in lever mechanism, of the main lever, a sliding pawl carried thereby, a racked member coacting with said pawl, means for moving said pawl into and out of engagement with the racked member, and automatically-operated means for limiting the operative movements of said lever by the pawl.

6. The combination in lever mechanism, of the main lever, engaging means carried thereby, a racked member coacting with said engaging means, and means for automatically releasing the engaging means from the lever as the latter is moved.

7. The combination in lever mechanism, of the main lever, engaging means carried thereby and normally connected thereto, a racked member adapted to coact with said engaging means, and means for disconnecting the engaging means from the lever upon the movement of the latter.

8. In lever mechanism, the combination of the main lever, engaging means carried thereby and connected thereto, a segmental rack adapted to receive said engaging means, means for raising said engaging means, and means carried thereby for disconnecting the same from the lever as the latter is moved.

9. The combination in lever mechanism, of the main lever, a sliding pawl carried thereby and normally connected thereto, a segmental rack having notches adapted to receive said pawl and means for disconnecting the pawl from the lever upon the movement of the latter.

10. In lever mechanism, the combination of the main lever, a vertically-sliding pawl carried thereby and connected thereto, a segmental rack having notches adapted to receive said pawl, means for raising the pawl and means carried by said pawl for disconnecting the same from the lever as the latter is moved.

11. The combination in lever mechanism, of the main lever, a pawl carried thereby and connected therewith, a segmental rack having notches adapted to receive said pawl, said rack having recessed portions in its face adjacent to said notches, a lever carried by the pawl, and a connection between the same and the main lever, said pawl-lever engaging the recesses of the segmental rack and moving on its pivot thereby disengaging itself and the pawl from connection with the main lever as the latter is moved.

12. The combination in lever mechanism, of the main lever, a vertically-sliding pawl carried thereby and connected therewith, means adjacent to the main lever for raising said pawl, a segmental rack having notches adapted to receive said pawl, said rack having recessed portions in its face adjacent to said notches, a lever carried by the pawl, said latter lever having a hooked end for connection with its operating means and a rounded end for engaging the recesses of the segmental rack, the latter engagement causing it to move on its pivot thereby disengaging itself and the pawl from connection with the main lever as the latter is moved.

13. The combination in lever mechanism, of the main lever, a racked member, engaging means for coaction with the racked member, and auxiliary mechanism controlling the action of said engaging means and operable by the movement of the main lever whereby such movement is limited to the extent of one tooth or notch of the racked member.

14. In lever mechanism, the combination of the main lever, a vertically-sliding pawl carried thereby, a segmental member having notches to receive said pawl, means for raising the pawl, means carried by said pawl for disconnecting the same from the lever as the latter is moved, and means for seating said pawl during such movement.

15. In lever mechanism, the combination of the main lever, a vertically-sliding pawl carried thereby, a segmental member having notches to receive said pawl, means for raising the pawl, means carried by said pawl for disconnecting the same from the lever as the latter is moved, and a spring for seating said pawl during such movement.

In testimony whereof I have signed my name to this specification in the presence of two subscribing witnesses.

LEE S. CHADWICK.

Witnesses:
 JAMES C. KRAGER,
 JOS. H. KLEIN.